United States Patent Office 3,442,361
Patented May 6, 1969

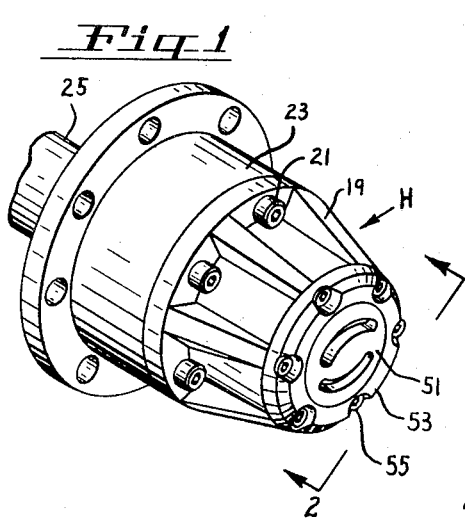
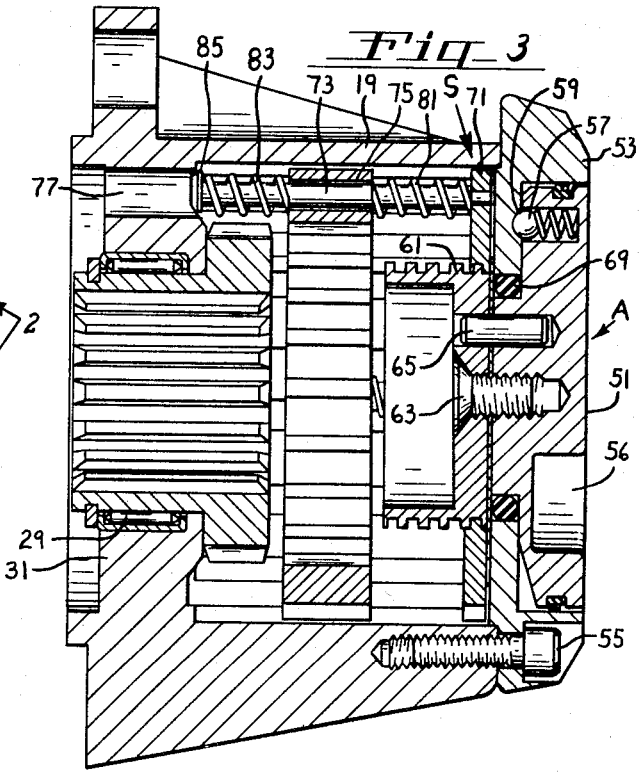
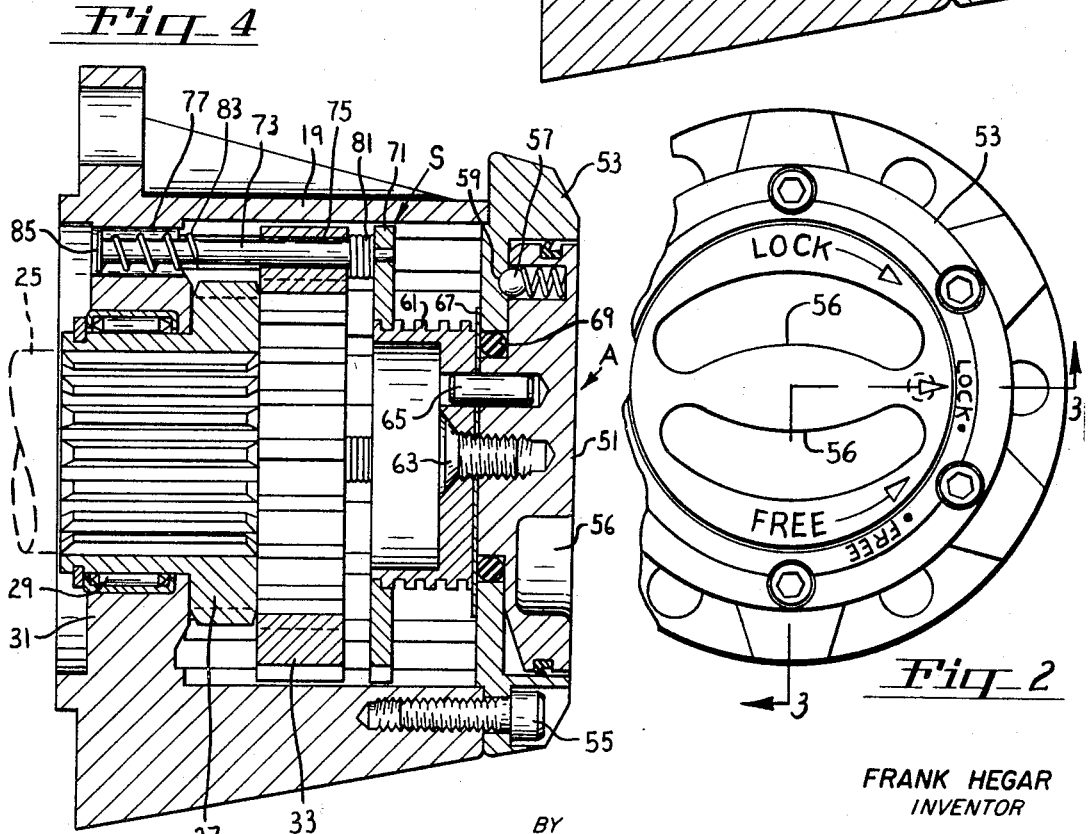
FRANK HEGAR
INVENTOR
BY BUCKHORN, BLORE, KLARQUIST & SPARKMAN
ATTORNEYS

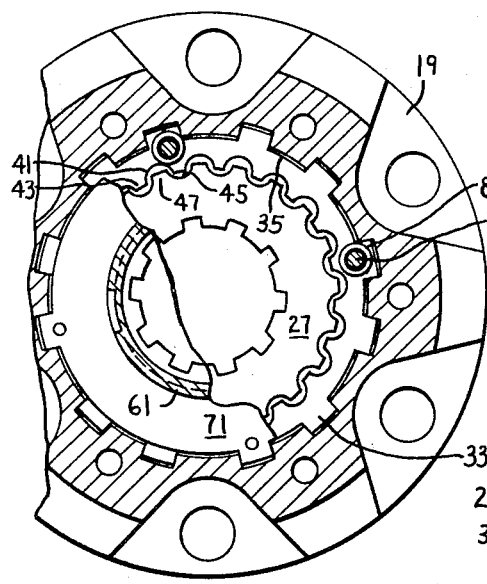
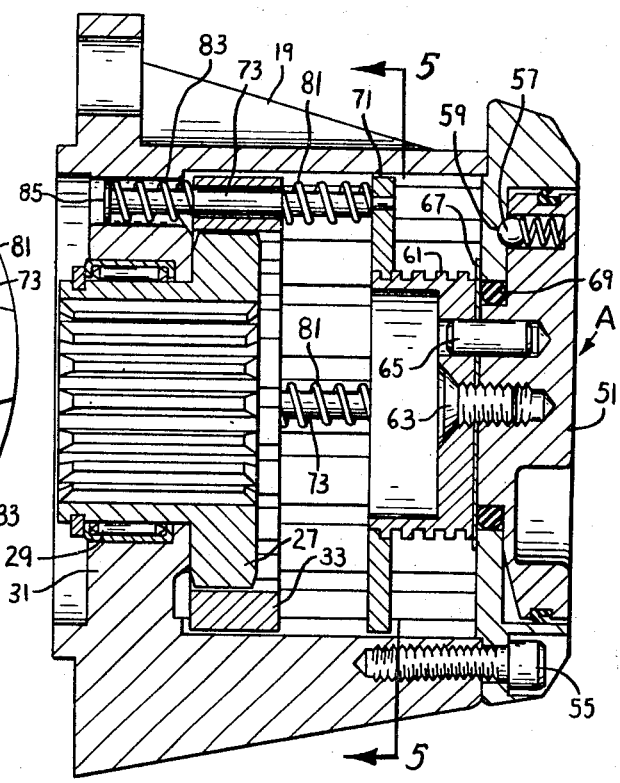
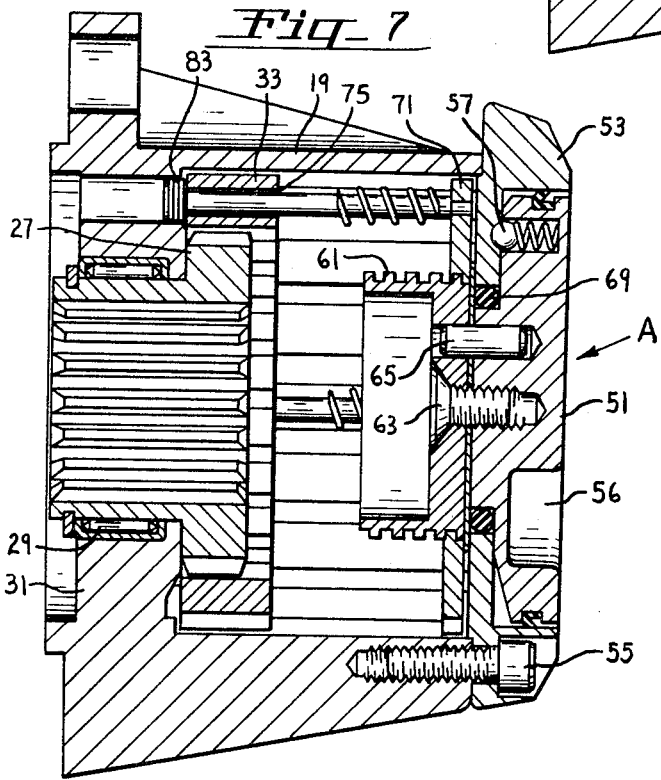

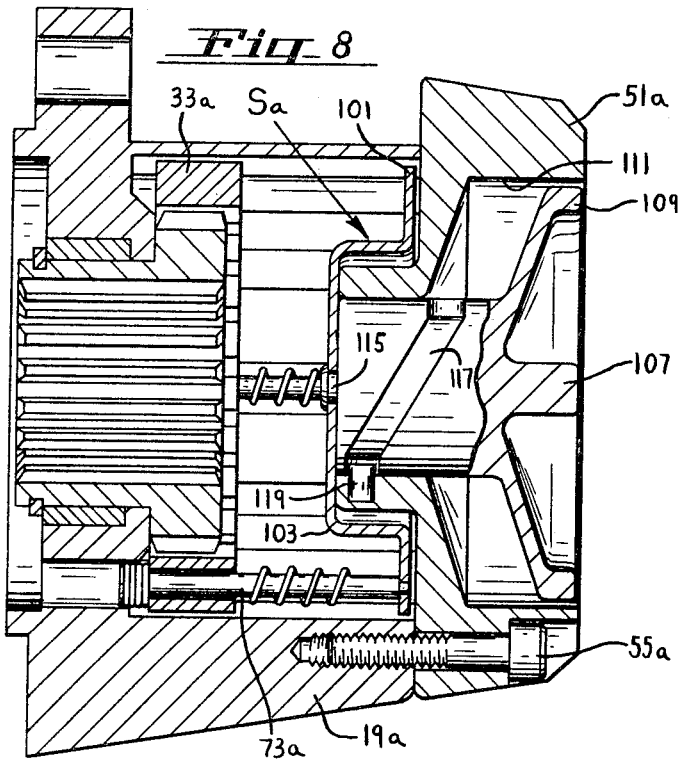
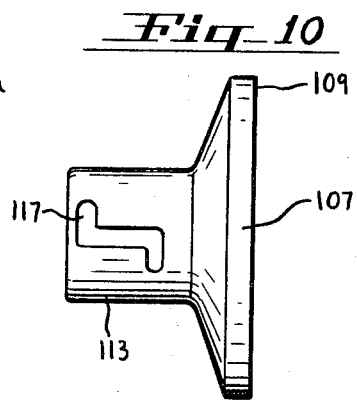
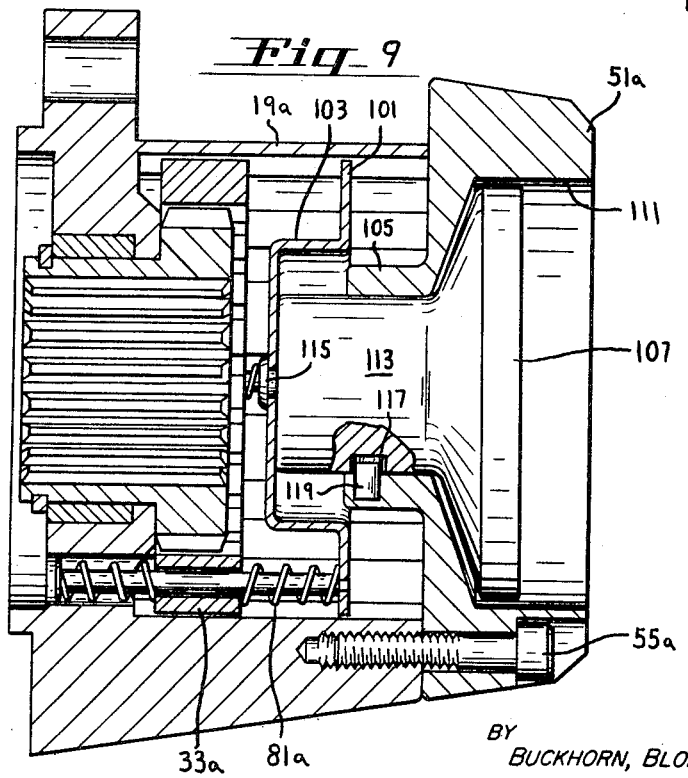

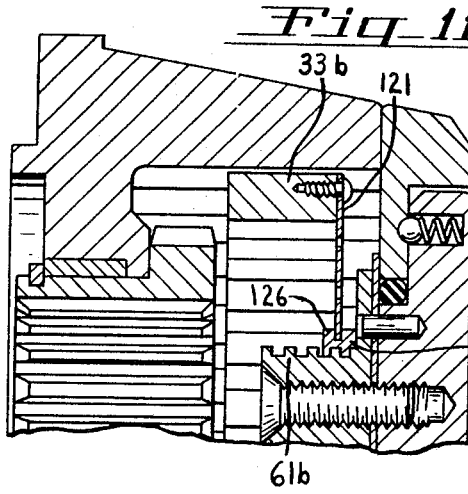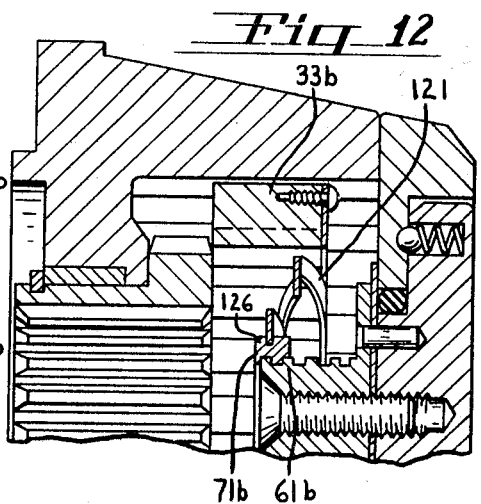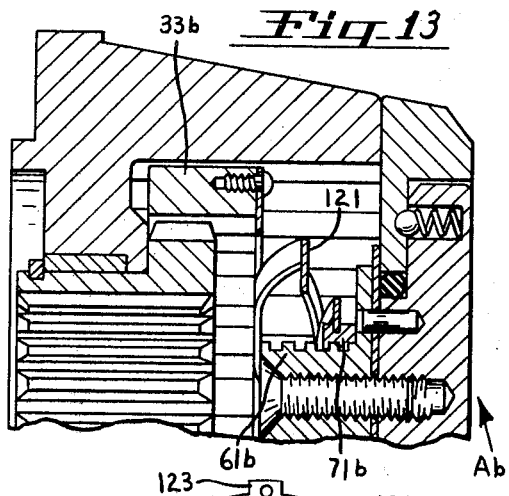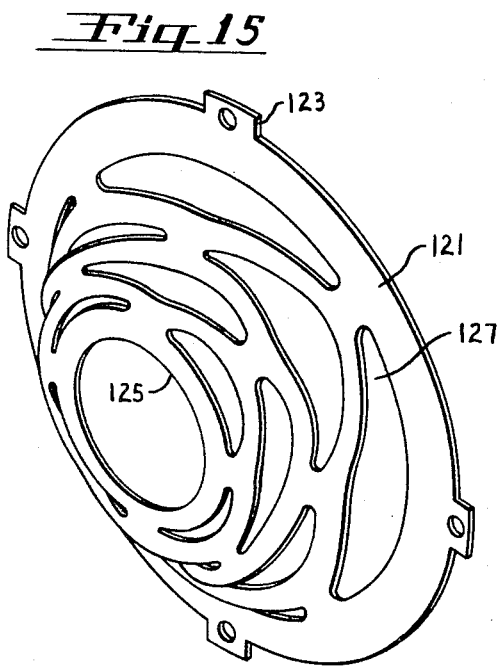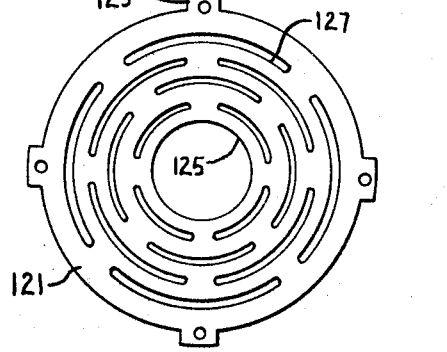

3,442,361
FRONT WHEEL HUB CLUTCH
Frank Hegar, Oregon City, Oreg., assignor to
Warn-Belleview, Inc., a corporation of Oregon
Filed June 29, 1967, Ser. No. 649,946
Int. Cl. F16d *11/04, 11/10, 13/22*
U.S. Cl. 192—67                          3 Claims

ABSTRACT OF THE DISCLOSURE

A vehicle front wheel hub clutch in which a housing, which is connectable to the front wheel, carries a rotary actuator which effects axial shifting movement of a spring compressor which has a splined fit within and to the housing. The compressor has a series of pins extending through an annular clutch member which has a splined fit with the housing and has teeth interiorly of the splines for engagement with teeth on a hub member, the latter being attachable to the front wheel drive axle. Two series of springs are provided on the pins, one on either side of the clutch member so that rotation of said actuator in one direction will compress one set of springs to create a biasing pressure on said clutch member for effecting engagement of the clutch member with the hub member, whereas rotation of the actuator in the opposite direction will compress the other set of springs to create a biasing pressure to move the clutch member out of engagement with the hub member.

BACKGROUND OF THE INVENTION

Field of invention

This invention relates to hub clutches for the front wheels of vehicles to establish or interrupt a driving connection between the engine and the front wheels so that the operator optionally has two or four wheel drive. Two wheel drive is normally desirable for highway use, while four wheel drive is many times desirable in back country operation.

State of the art

Hub clutches conventionally have manual actuators directly connected to the clutch to operate the same in accordance with the adjustment of the manual acuator. When the clutch teeth are in alignment with one another at the time it is attempted to operate the manual actuator, the actuator simply cannot be operated until the aligned interfering condition is eliminated, such as by movement of the vehicle. Also, when the clutch is in an engaged position and it is sought to move the actuator to a retracted condition to effect disengagement of the clutch, it may not be possible to force them apart without fear of damaging the structure if the clutch parts are in tight frictional engagement, whereupon it may be necessary to move the vehicle to eliminate the tight frictional binding fit to enable the actuator to be adjusted.

The known art in the field are the O'Brien Patent No. 3,124,377 and the following patents located during the course of a search in regard to one form of the invention of the application. Other hub clutch patents related to the present inventors are as follows:

Search patents: 2,844,238, 2,883,025, 2,948,557, 2,984,-324, 3,017,207, 3,050,321, 3,125,363, 3,184,258.

Additional patents: 2,684,140, 2,884,101, 3,055,471.

SUMMARY OF THE INVENTION

The inventive hub clutch of the present invention overcomes the above problems by providing between the clutch actuator and the clutch an operative connection in the form of double acting spring means which enables any desired operation of the actuator despite the existence of conditions preventing corresponding action of the clutch, wherein the spring means is stressed, whenever the actuator is actuated and the above conditions exist, to apply a biasing pressure to the clutch to effect the desired actuation of the clutch upon disappearance of the interfering conditions.

BRIEF DESCRIPTION OF THE DRAWINGS

FIG. 1 is a perspective view of a hub clutch of the invention showing it in its immediate environment;

FIG. 2 is an end view of the hub clutch shown in FIG. 1, on a larger scale;

FIG. 3 is a sectional view taken along line 3—3 of FIG. 2, showing one position of adjustment of the parts;

FIG. 4 is a view like FIG. 3, but showing another position of adjustment;

FIG. 5 is a vertical sectional view taken along line 5—5 of FIG. 6;

FIG. 6 is a view like FIG. 3, but showing a still different position of adjustment of the clutch;

FIG. 7 is a view like FIG. 3, but showing a further position of adjustment of the clutch;

FIG. 8 is a sectional view similar to the one in FIG. 3, but showing a modified form of the invention;

FIG. 9 is a view similar to FIG. 8, but showing a different end condition of adjustment of the parts;

FIG. 10 is a view of part of the actuating mechanism of the hub clutch;

FIG. 11 is a fragmentary midsectional view through a still further modified form of the invention;

FIG. 12 is a view like FIG. 11, but showing the parts in a different position of adjustment;

FIG. 13 is a view like FIG. 11, but showing the parts in a still different position of adjustment;

FIG. 14 is a face-on view of the wafer spring of the clutch of FIG. 11; and

FIG. 15 is a perspective view of the spring on a larger scale than in FIG. 14.

FIG. 1 shows the inventive hub clutch H which has a housing 19 mounted by bolts 21 on a wheel hub 23, the drive shaft 25 for the wheel having a spline fit with an inner clutch member 27 (FIGS. 1 and 3). The inner clutch member 27 is rotatably mounted by a bearing 29 in a web 31 of the housing 19.

An annular outer clutch member 33 is associated with the inner clutch member and has a spline fit at 35 (FIG. 5) with the housing 19 so that it is slidably but non-rotatably connected to the housing.

The outer clutch member has grooves 41 (FIG. 5) formed therein providing teeth 43 while the inner clutch member has similar grooves 45 and teeth 47.

The mechanism for causing engagement or disengagement of the clutch parts 27 and 33 includes an actuator unit A and a slide unit S. The actuator unit includes a turnable plug disc 51 rotatably mounted in a cap 53 which is secured by bolts 55 to the housing 19. The disc 51 has finger grooves 56 (FIG. 2) to facilitate turning it and carries a spring pressed detent 57 which snaps into a dimple 59 (FIG. 3) when the disc is either in its clutch engaging position (FIG. 4) or its clutch disengaging position (FIG. 3). A positive stop arrangement (not shown) may also be provided for limiting the turning movement of the disc 51.

The actuator unit also includes a short feed screw 61 which is secured to the actuator disc 51 by a central bolt 63. The screw is preferably of the multiple thread type. A quadruple thread screw has proved satisfactory. A dowel pin 65 prevents relative rotation of the feed screw 61 and disc 51. A retainer wafer 67 is clamped between the screw and disc and retains the actuator unit in place.

An O-ring 69 precludes the entry of foreign matter into the housing from the exterior.

The slide unit S includes a nut 71 on the screw 61, the nut carrying four pins or rods 73 which project through holes 75 in the outer clutch member 33 and extend into bores 77 formed in the housing web 31.

An outer series of compression springs 81 surround the pins 73 in the zone between the outer clutch member 33 and the nut 71, while an inner series of compression springs 83 surround the pins 73 in the zone between the outer clutch member 33 and the web 31. The inner ends of the pins 73 have heads 85 for a purpose to be described.

The operation is as follows: FIG. 3 shows the disengaged position of the clutch. Assume that the teeth 43 and 47 of clutch members 33 and 27, respectively, are in alignment with one another. This condition will be considered as an interfering relationship of the clutch parts or members 33 and 27. However, even with such condition the clutch actuator unit A can be turned to move the slide S from its outer disengaging position to its inner engaging position, because the springs 81 will simply be compressed as shown in FIG. 4.

The vehicle can now be driven, and almost immediately the relative movement between the driven inner clutch member 27 and the outer clutch member 33 causes registry of the teeth of each clutch member with the grooves of the other, whereupon the biasing pressure on the outer clutch member 33 causes it to snap inwardly (FIG. 6) into engaged position with the inner clutch member. Thus, the driver of an automobile need not be concerned that an interfering relation between inner and outer clutch parts will prevent operation of the actuator unit, as is now the case with most hub clutches.

Now, assume that the clutch is engaged as shown in FIG. 6, but it is desired to disengage it. Further assume that because of shaft twist and other factors, there is tight frictional bearing engagement between the teeth of the inner and outer clutch members 29 and 33. In the usual hub clutch, this would make it difficult or impracticable to turn or operate the clutch actuator to its disengaging position (and thus require movement of the vehicle to a position where the tight bearing fit would be released). With the present hub, however, the clutch actuator A may be turned to its disengaging position as shown in FIG. 7 to retract the slide S, even though the outer clutch member 33 is frictionally held in its inner engaged position. Under such circumstances the inner springs 83 are merely compressed by the heads 85 to apply an outwardly directed biasing pressure to the outer clutch member 33. As soon as the vehicle is driven a short distance, the tight fit between the clutch members is lessened sufficiently to enable the spring biasing pressure to force the outer clutch member outwardly to its disengaged position (FIG. 3).

FIGS. 8–10 show a hub clutch like that in FIGS. 1–7 but with a cam type actuator instead of a screw type as shown in FIGS. 1–7. The parts of FIGS. 8–10 that are the same as those in FIGS. 1–7 (or substantially the same) are given the same reference numerals but differentiated by the subscript "a".

The slide Sa has the pins 73a thereof anchored at their outer ends in a follower plate 101 which has a splined fit with the interior of the housing 19a. The follower plate has a depressed central portion 103 accommodating an inwardly projecting hollow boss 105 on a cap 15a which is secured by bolts 55a to the housing 19a.

A cam type actuator member 107 has a head 109 accommodated within a recess 111 of the cap 51a and has a shaft-like shank portion 113 rotatably received by the boss 105 and rotatably connected to the center of the follower plate 101 by a rivet 115 (or equivalent connection).

The cam member 107 has a Z-slot 117 formed in its shank which slot receives a stub pin 119 on the hollow boss 105.

In operation, when the actuator member 107 is turned from its FIG. 9 position to its FIG. 8 position, the actuator member is cammed outwardly by the cooperative engagement of the Z-slot 117 and the pin 119 to shift the follower plate 101 outwardly to compress the inner series of springs 81a to apply an outward biasing pressure against the outer clutch member 33a. In FIG. 8, it is assumed that there is a holding frictional fit between the two clutch members and shows that this does not prohibit movement of the clutch actuator 107 to its clutch disengaging position.

FIGS. 11–15 show a further modified form of the invention in which the two way biasing effect is obtained by a simple wafer spring 121 which is secured by four peripheral lugs 123 to the outer clutch member 33b. The spring has a hole at its center defined by a circular marginal portions 125 which fits on a nut 71b which is threaded on a screw 61b. After the spring is in place the the nut is peaned or upset or spun over at 126 to retain the spring in place. The screw 61b is actuated by an actuator unit Ab to run the nut to an inward clutch engaging position, or outwardly to a clutch disengaging position.

The wafer spring has plural rows of concentric but staggered slots 127 so that the spring can yield substantially in an axial direction. In fact, the nut 71b can be run in to its clutch engaging position even though an interfering relationship (FIG. 12) of the clutch members prevents such members from (immediately) assuming an engaged position. The reverse relationship shown in FIG. 13 is also possible.

Having described the invention in what is considered to be the preferred embodiment thereof, it is desired that it be understood that the invention is not to be limited other than by the provisions of the following claims.

I claim:

1. An adjustable clutching mechanism for four wheel drive vehicles to drivingly connect a front wheel to the associated front wheel axle which is driven by the vehicle engine, said mechanism comprising a housing having means whereby it may be attached to the front wheel, a hub member having means whereby it may be attached to the front axle, means rotatably mounting said hub member within said housing, teeth on an exterior portion of said hub member, an annular clutch member having a splined fit with the interior of said housing and being movable back and forth within said housing toward and away from said hub member, said clutch member having interior teeth to mesh with the teeth of said hub member, means for shifting said clutch member into and out of engagement with said hub member, the last named means including a manually operable actuator rotatably mounted in said housing, a spring compressor member having a splined fit within said housing and movable toward and away from said clutch member and said hub member, means whereby rotary movement of said actuator causes axial movement of said compressor member relative to said housing in either of two directions depending on the direction of rotation of said actuator, a series of pins distributed around and connected to said compressor member and slidably extending through said clutch member, said pins having stop means on the ends thereof remote from said compressor member, and two sets of compression springs on said pins, one set being disposed between said clutch member and said compressor member and the other being disposed between said clutch member and said stop means whereby rotation of said actuator in one direction will compress one set of springs to urge said clutch member one way, while rotation of said actuator in the opposite direction will cause compression of the other set of springs to urge said clutch member the opposite way.

2. A mechanism as set forth in claim 1 wherein there are means preventing axial movement of said actuator upon rotation thereof.

3. A mechanism as set forth in claim 1 wherein said actuator member is axially movable during rotation thereof.

References Cited

UNITED STATES PATENTS

| | | |
|---|---|---|
| 1,177,133 | 3/1916 | Parker. |
| 2,356,598 | 8/1944 | Lang et al. _____ 192—86 X |
| 2,641,342 | 6/1953 | Hasbrouck. |
| 2,684,739 | 7/1954 | Hasbrouck. |
| 2,844,238 | 7/1958 | Peterson _____ 192—67 |

BENJAMIN W. WYCHE III, *Primary Examiner.*

U.S. Cl. X.R.

192—93, 94, 109, 114; 287—53